United States Patent [19]

Knapp

[11] 4,250,912

[45] Feb. 17, 1981

[54] CARTRIDGE FAUCET FOR HYDRAULIC SYSTEMS

[76] Inventor: Alfons Knapp, Bleicherstrasse 3, Biblrach an der Riss, Fed. Rep. of Germany

[21] Appl. No.: 80,316

[22] Filed: Oct. 1, 1979

[30] Foreign Application Priority Data

Oct. 20, 1978 [IT] Italy .............................. 69405 A/78

[51] Int. Cl.³ .......................................... F16K 43/00
[52] U.S. Cl. ................... 137/315; 137/454.6; 251/208
[58] Field of Search ................... 137/454.2, 454.6, 315

[56] References Cited

U.S. PATENT DOCUMENTS

| | | | |
|---|---|---|---|
| 2,658,715 | 11/1953 | Kistner | 137/454.6 X |
| 3,698,418 | 10/1972 | Schmitt | 137/315 |
| 3,831,621 | 8/1974 | Anthony | 137/454.6 X |

FOREIGN PATENT DOCUMENTS 2253462 10/1972 Fed. Rep. of Germany ........ 137/454.6

Primary Examiner—Harold W. Weakley
Attorney, Agent, or Firm—Young & Thompson

[57] ABSTRACT

A faucet with an extractable cartridge enclosing two plates sliding at mutual contact for the control of the water flow, wherein the envelope of the cartridge is inserted in the faucet body in non rotatable manner but with a possibility of axial displacement, and a shoulder of a rotatable portion of the cartridge abuts against the internal surface of a cover, in view of avoiding need for preloading springs and for severe working tolerances. Both internal plates are identical with one another. A window in the envelope of the cartridge and a recess in the rotatable portion thereof cooperate in throttling the flow in the intermediate control positions.

10 Claims, 12 Drawing Figures

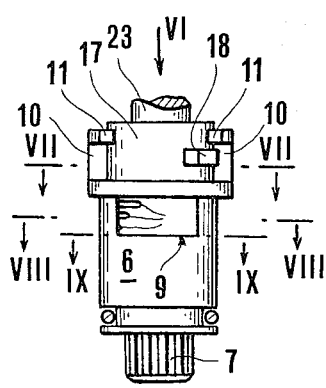
FIG. 5
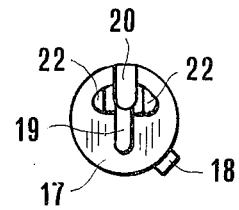
FIG. 11
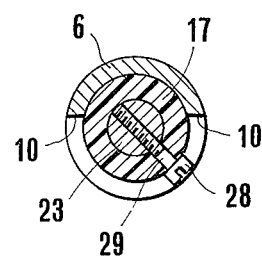
FIG. 12
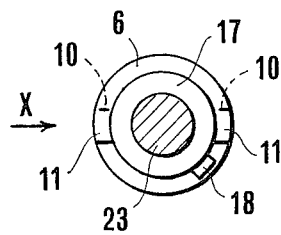
FIG. 6
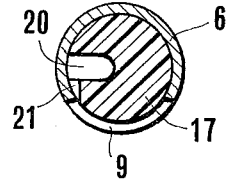
FIG. 10
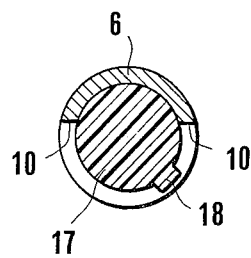
FIG. 7
FIG. 8
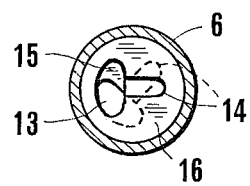
FIG. 9

CARTRIDGE FAUCET FOR HYDRAULIC SYSTEMS

BACKGROUND OF THE INVENTION

The present invention relates to a faucet for a hydraulic system, of the type comprising an extractable cartridge mounted in the body of the faucet and containing a first stationary plate and a second rotatable plate in contact with the first one under the control of a handle, the said two plates being interposed between an inlet pipe union and an outlet pipe union and being traversed by apertures in such a way that in the position in which the apertures of the two plates do not match with one another the flow is intercepted, in the position in which the apertures completely match with one another the maximum flow passage takes place, and in intermediate positions a flow is obtained which is adjustable at will.

In a known type of faucet of this kind, each plate is traversed by two diametrically opposed apertures, wherefore the angular displacement of the handle between the interception and the largest flow positions is of 90°. This imparts a poor sensitivity to the faucet and renders it necessary to use a costly fine toothing coupling to allow locking the handle in the correct position. Furthermore, in this faucet the cartridge is screwed in the body and requires a machining which is expensive because of the small tolerances required. The plates have to be held in mutual contact by means of a preloaded spring which is in its turn retained by a snap ring, which renders more complicate the construction and the disassembly operations of the cartridge. Special small nets have to be introduced into the apertures of the rotatable plate to attenuate the noise of the flow. Because of these conditions set forth hereinabove the faucet results in being expensive and relatively difficult to assemble and disassemble, and in addition it can be used only in case of particular configurations of the body and is not suitable for being used either with the normal faucets with an elongated body having a deep cavity or in the cases in which only particularly limited overall dimensions are acceptable.

BRIEF SUMMARY OF THE INVENTION

The object of the present invention is to obviate all or part of the disadvantages of the known faucet of the type specified hereinabove, providing an economical and versatile construction easily and handily assemblable and disassemblable, eventually also without the aid of any tool, as regards both the introduction of the cartridge into the body of the faucet and the arrangement of the parts forming the cartridge.

According to the main characteristic of the invention, the cartridge containing the two plates is mounted wihtin the body of the faucet in such a way as to be prevented from rotating, but to be able to slide in an axial direction, and is retained therein by a cover removably fixed to the body and acting against a shoulder provided on a rotatable portion of the cartridge, against which the rotatable plate rests, whilst the stationary plate is sealingly inserted at the bottom of the cartridge in such a way as to be prevented from rotating relative to the latter.

Owing to this characteristic, the pressure of the incoming water, by acting onto the whole cross-section of the cartridge, pushes this latter so as to press the stationary plate against the movable plate and this latter against the rotatable portion whose shoulder rests against the cover. This arrangement avoids the necessity of providing a preloaded spring and the respective retaining means, considerably simplifies the construction and, above all, avoids any necessity of small machining tolerances and also compensates eventually cropped up clearances, thermal expansions and the like.

The assembly of the cartridge in a non rotatable fashion in the body of the faucet may, preferably, be obtained by means of an extension of the cartridge, indented or otherwise shaped with a non circular contour, inserted into a complementary bore broached or otherwise formed in the body of the faucet; the cover may be screwed into the body and, since it does not require a vigorous tightening, it may be knurled in view of facilitating its manual actuation; and the shoulder may be formed directly on a rotatable head coupled to the rotatable plate, thus allowing installations with minimum space requirements, or it may be formed on an actuation shaft of any length, coupled to the said head, in which case it may be installed in bodies having a deep cavity, such as the normal deep cavity elongated faucets.

Preferably, the rotatable portion of the cartridge, against which the rotatable plate rests, has a projection cooperating with stops of the envelope of the cartridge to provide in a simple way a limitation of the range of rotation, and the envelope itself may be provided with at least a projection arranged to form with the said projection of the rotatable portion a bayonet joint in at least one of the two extreme positions of complete opening or complete closure, so that in the positions in which the said bayonet joint results in being coupled, the cartridge constitutes a coherent assembly which may be easily assembled or disassembled with respect to the body of the faucet, whilst, when the said bayonet joint is uncoupled, the inner parts of the cartridge may easily be extracted from the cartridge for inspection, cleaning or substitution purposes.

Preferably, each of the plates according to the invention has a single through aperture having substantially the configuration of a circular segment, which allows having an actuation range of 180°, and is also provided, at the side opposed to the working surface cooperating with the other plate, with a recess extending perpendicularly to the aperture and serving to couple the plate to the body of the faucet or to a control head, respectively, and the said stationary and movable plates may be completely identical with one another.

Preferably, the control head coupled to the rotatable plate has a passage aperture which cooperates with a window in the envelope of the cartridge so as to throttle the flow in the intermediate adjustment positions, thus assuming the main function in the adjustment of the flow, whilst the plates are entrusted with the task of intercepting the flow. This allows to reduce to a minimum the noise of the flow, without having to provide special nets or other elements.

BRIEF DESCRIPTION OF THE DRAWINGS

The above and other characteristics and advantages of the present invention will be more clearly apparent from the following description of some embodiments given by way of non limiting examples, shown diagrammatically in the annexed drawings, in which:

FIG. 5 shows the cartridge alone, extracted from the body of the faucet, seen from the side of the delivery window and shown in an intermediate adjustment position;

FIG. 6 is an axial view in the direction of the arrow VI of FIG. 5;

FIGS. 7, 8 and 9 are sectional views along lines VII—VII, VIII—VIII and IX—IX of FIG. 5;

FIG. 10 shows the control head of the rotatable plate, extracted from the cartridge and seen in the direction of the arrow X of FIG. 6;

FIG. 11 is an axial view in the direction of the arrow XI of FIG. 10; and

FIG. 12 is a sectional view similar to that of FIG. 7, but relating to a modified embodiment.

DETAILED DESCRIPTION OF THE PREFERRED EMBODIMENTS

Figure 1:
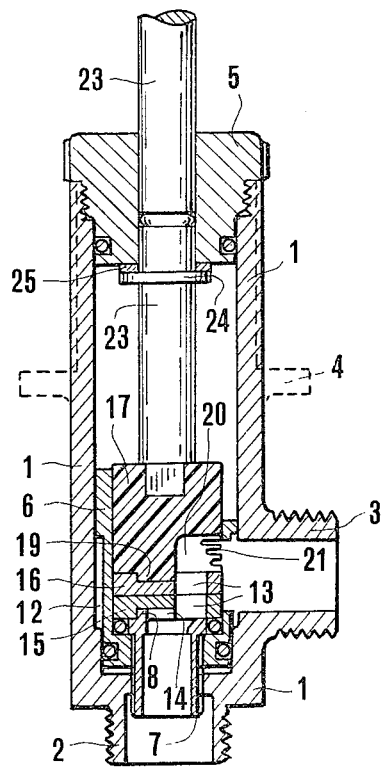
FIG. 1 is an axial section of a first embodiment of the faucet according to the invention, shown assembled in its fully opened condition.

The faucet shown in FIG. 1 has a deep cavity body 1 provided with an inlet union 2 disposed at its lower end and a lateral delivery union 3. This faucet body may for example be threaded externally and provided with a flange 4, thus forming a normal deep cavity elongated body for hydraulic apparatuses with three holes. It is threaded internally at its upper end to receive a cover 5, and the only substantial characteristic which distinguishes it from a normal faucet body of similar dimensions is that in correspondence with the inlet union 2, instead of a sealing seat for a movable seal, there is provided a bore, which in the present case is indented, anyway non circular, for example broached, intended to receive the correspondingly shaped projection of the cartridge which will be described later.

Figure 2:
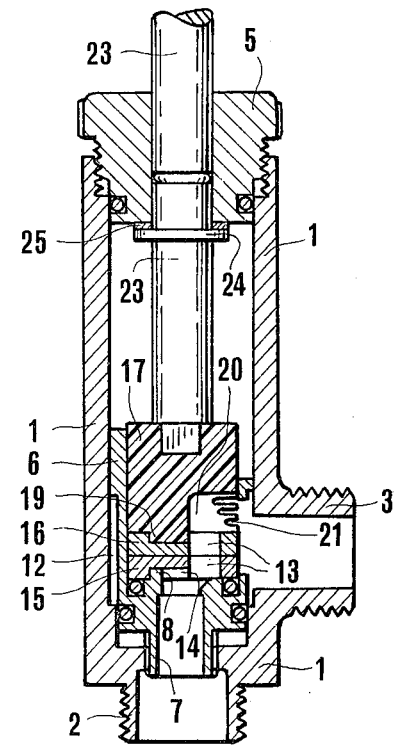
FIG. 2 is a similar sectional view of a second embodiment, which differs from the first embodiment in a detail of the cartridge and is shown with the cover imperfectly tightened on the body of the faucet.
Figure 4:
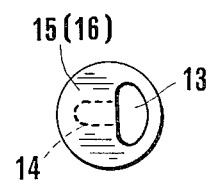
FIG. 4 shows one of the plates of the faucet, as seen frontally from the side of its working surface.
Figure 3:
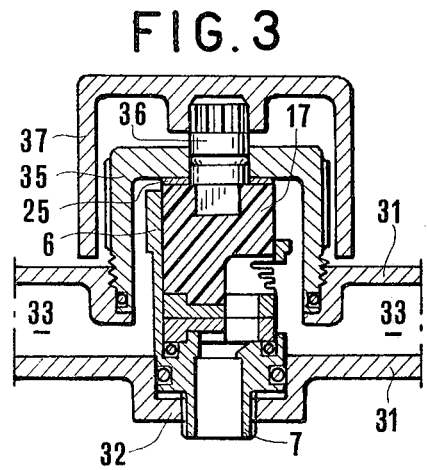
FIG. 3 is a similar sectional view of a third embodiment having completely different space requirements and yet utilizing the same cartridge of the embodiment shown in FIG. 2.

The cartridge introduced into the body 1 comprises a substantially cylindrical envelope provided with an external gasket intended to create a sealing in the inner cylindrical cavity of the body 1 between the inlet and outlet unions. Envelope 6 is open at its upper end and has, at its lower end, a bottom traversed by a shaped bore equal to that of the body 1, having inserted therein a bushing 7, in the present case an indented bushing, which protrudes therefrom downwardly, thus forming a projection to be inserted into the shaped bore of the body 1. Owing to this coupling, the envelope 6 of the cartridge, inserted into the body 1 of the faucet, may move axially, but is prevented from rotating. The indented bushing 7 is provided also in its interior with a projection 8 arranged to engage the stationary plate of the faucet in order to prevent it from rotation. The cartridge shown in FIGS. 2 and 3 differs from that shown in FIG. 1 only in that the indented bushing 7 and the inner projection 8 are integral with the bottom of the envelope 6 of the cartridge instead of being formed by a bushing manufactured separately and inserted into an indented bore of the envelope 6. The embodiment shown in FIG. 1 is particularly suitable in the case in which the envelope is made of metal, whilst the embodiment shown in FIGS. 2 and 3 is particularly suitable for it being made of a synthetic material.

The envelope 6 of the cartridge has a delivery window 9, and preferably both the envelope and the inner cavity of the body 1 have two different diameters separated from one another by a step, so as to define around the envelope 6 an annular chamber 12 into which the delivery window opens and which communicates with the delivery union 3, thus ensuring the correct operation whatever the position of the cartridge in the body may be, although Figures from 1 to 3 show the most rationl position, in which the delivery window 9 is located directly in front of the delivery union 3. Above the delivery window 9 the envelope 6 is limited to a sector, thus forming two stops 10 arranged to cooperate with a tooth 18 of a rotatable head 17 described later, to limit the range of rotation. Above the stops 10 the envelope 6 is provided with two projections 11 apt to constitute a bayonet joint with the tooth 18 when this latter is situated near one of the said stops 10, as will be explained later.

The two plates of the faucet are identical with one another, and each of them, looking at it from the side of the working surface intended to slide in contact with the other plate, is substantially circular in shape and has an excentrical through aperture 13 in the form of a circular segment; furthermore, formed on the surface opposed to the working surface is a recess 14 which extends perpendicularly to the aperture 13 and serves to constrain the plate in respect of rotation. The stationary plate 15 is inserted into the envelope 6 of the cartridge and rests on its bottom, with the interposition of a sealing gasket, whilst its recess 14 engages the projection 8, thus preventing plate 15 from rotation. The rotatable plate 16 rests on the stationary plate 15 with its recess 14 turned upwards. In the envelope above the plate 16 there is a control head 17, substantially cylindrical in shape, which is provided with a tooth 18 arranged to cooperate with the stops 10 of the envelope 6 in order to limit to about 180° the range of rotation of the head 17 within the envelope. In addition, control head 17 is provided with: a projection 19 apt to engage the recess 14 of the rotatable plate 16 to constrain it to rotate together with the head 17; a recess 20 extending between the front surface of the head 17, in register with the aperture 13 of the rotatable plate 16 coupled to the said head, and the lateral surface of the head; thin cuts 21 having different lengths, extending from one side of the recess 20; and preferably, lower projections 22 which penetrate partly into the aperture 13 of the rotatable plate 16. These latter projections have the double function of contributing to the coupling between the head 17 and the plate 16, and regulating the flow through the aperture 13 of the plate 16, in order to reduce the noise produced by the flow.

The tooth 18 of the rotatable head 17, in addition to cooperating with the pawls 10 to limit the range of rotation, when it is situated adjacent one of these pawls it engages, like a bayonet joint, below one of the extensions 11 of the envelope 6 of the cartridge. In these conditions, the rotatable head 17 cannot be extracted from the envelope 6 and therefore the whole cartridge forms a compact assembly which may be inserted into the body of the faucet or extracted therefrom, without decomposing. Conversely, when rotating the head 17 to an intermediate position, the tooth 18 disengages from the extensions 11, and the head 17 may be freely extracted from the envelope 6, thus allowing to remove the cartridge without having to use any tools.

Therefore, the arrangement described hereinabove allows to provide a cartridge which may be assembled and disassembled with extreme easiness and without the aid of any tools, and which, nevertheless, behaves like a unitary assembly during the introduction into or the extraction from the body of the faucet, thanks to the simple contrivance consisting in that the control head, during these latter operations, is rotated till it reaches one of its extreme positions of complete closure or opening, respectively.

The embodiment considered so far implies the control head 17 to be permanently connected to the shaft 23, for example by being made integrally therewith, if they are made of the same material, or by being formed directly on the end of the shaft, if the control head is made of plastics; or, also, the said two parts to be steadily coupled by tight fit, welding, glueing or other suitable means. Conversely, according to the embodiment shown in FIG. 12, the control head 17 is removably coupled to the shaft 23 and is fixed to it by means of a transversal screw 29 whose outer end 28 assumes the function of the tooth 18.

In this case, the upper end of the envelope 6 of the cartridge may have a continuous arcuate portion instead of the extensions 11, thus defining between the stops 10 a window in which the end 28 of the screw 29 moves to define the range of rotation. In this case, the removal of the cartridge may be carried out by unscrewing the screw 29, and thereafter the control head 17 may be extracted from the envelope 6.

With the faucet in its opened condition (FIGS. from 1 to 3), the recess 20 of the head 17 is aligned both with the two apertures 13 of the two plates, and consequently also with the inlet union 2, and with the window 9 of the envelope 6 and consequently (directly or through the annular chamber 12) with the delivery union 3, and therefore the flow freely passes from the inlet union 2 to the delivery union 3. By rotating the head 17, first the recess 20 of the head 17 ceases to be aligned with the window 9 of the envelope 6 and consequently throttles the passage and reduces the flow. This action is rendered particularly gradual by the presence of the cuts 21 of different length which ensure a limited passage in the throttled condition; moreover, a limited communication is given by the clearance between the head 17 and the surrounding envelope 6 of the cartridge. In the strongly throttled condition thus obtained (FIG. 8), as shown in FIG. 9, the apertures 13 of the plates 15 and 16 are still amply superposed to one another, which proves that the action of adjustment of the flow is mainly entrusted to the cooperation between the window 9, the recess 20 and the cuts 21. This results in a strong reduction of the noise of the faucet. Finally, continuing the rotation of the head 17, the apertures 13 of the plates 15 and 16 assume diametrically opposed positions, cease communicating with one another and produce the complete interception of the flow. This position, as well as that of complete opening, is exactly defined by the cooperation of the tooth 18 of the head 17 with the stops 10 of the envelope 6 of the cartridge.

Fixed to the head 17 is a shaft 23 which traverses the cover 5 to receive a control handle (not shown in FIGS. 1 and 2), and which (in the embodiments shown in FIGS. 1 and 2) is provided with a shoulder 24 which abuts, through an antifriction washer 25, against the inner surface of the cover 5.

When the union 2 is connected to a pipe of a liquid under pressure, the pressure is transmitted, through the coupling of the indented extension 7, to the space between the bottom of the envelope 6 of the cartridge and the bottom of the body 1 of the faucet, and therefore exerts onto the cartridge a thrust upwards. This thrust is transmitted from the bottom of the cartridge (which is movable in an axial direction) to the stationary plate 15, from this latter to the movable plate 16, the head 17, the shaft 23, the shoulder 24, the cover 5, and finally discharges onto the body 1 of the faucet. Thanks to this behaviour, rendered possible by the fact that the envelope 6 of the cartridge is not connected rigidly in the axial direction directly to the body of the faucet, an adhesion under pressure between the plates 15 and 16 is always ensured, thus allowing to avoid using a preloading spring, and besides this all possible clearances are taken up. There is no need for precision in mounting the cartridge within the faucet, on the contrary, as shown in FIG. 2, the operation continues to be perfect even if the cover 5 is only partially screwed in the body 1, provided, however, that the screwing is sufficient to establish a sealing by means of a peripheral gasket. Therefore, not even a strong tightening of the cover 5 is necessary, which cover could simply be knurled on its periphery to allow a tightening by hand and a removal without the aid of any tool.

As it can be seen in FIGS. 1 and 2, the cartridge according to the present invention is suitable for providing deep cavity faucets, such as the elongated body deep cavity faucets, this being an application for which the prior art faucets of the type in question are not suitable. An important aspect, however, consists in the fact that the same cartridge is suitable also for providing faucets to install where, on the contrary, the space available in the axial direction is extremely limited. An example of such an embodiment is shown in FIG. 3. In this embodiment, the body 31 of the faucet (which may be part, for example, of a mixing collector) is substantially flat and provided with an inlet 32 and a delivery chamber 33. In this case the cartridge 6 is mounted in such a way as to allow being displaced axially, but not rotated, within the inlet 32, and a cap-shaped cover 35 is screwed on the body 31, which cover has extending therein and projecting with respect to body a portion of the cartridge of the faucet. Cover 35 defines a passage for the return of the water into the body of the faucet. The shoulder, designed to abut against the inner surface of the cover 35 through an antifriction washer 25, in this case is constituted directly by the upper surface 27 (FIG. 10) of the control head 17. This latter is provided with a very short actuating shaft 36, to which a control handle 37 is coupled, which surrounds the cap-shaped cover 35. As can be appreciated, in this way a large portion of the faucet extends inside the control handle, thus allowing to obtain a high copactness.

It is clear, on the other hand, that the same cartridge, whose suitableness for being used in two cases having opposed requirements of deep axial penetration or of minimum availability of space in the axial direction, respectively, may be utilized in faucets of substantially any normal or special shape.

As a modification, the recess 20 of the control head 17, instead of cooperating with cuts 21 of different lengths, may extend in one or more shaped, gradually tapered parts having the same function as the cuts 21. Alternatively, cuts similar to the cuts 21 could be formed on the edge of the window 9 of the envelope 6 of the cartridge.

Having thus described my invention, what I claim is:

1. In a faucet for a hydraulic system, comprising a faucet body having an inlet union and an outlet union, a cover removably fixed to said body, and a cartridge extractably mounted in said body and retained therein by said cover, said cartridge comprising a stationary envelope and, in said envelope, a rotatable portion, a first stationary plate and a second rotatable plate coupled with said rotatable portion of the cartridge, said first and second plates being slidingly arranged the one against the other and having through apertures cooperable in controlling a water flow from said inlet union to said outlet union, the improvement that said faucet body has an inner non circular bore, said cartridge envelope has a non circular portion cooperable with said non circular bore of the faucet body in coupling said envelope in non rotatable but axially displaceable relationship with said body, said rotatable portion of the cartridge has a shoulder resting against the inner surface of said cover, said stationary plate is sealingly inserted in the bottom of said cartridge envelope and said rotatable plate is coupled in resting and solid in rotation relationship with said rotatable portion of the cartridge.

2. A faucet as set forth in claim 1, wherein said non circular portion of the cartridge envelope is a protruding indented bushing, and said non circular bore of the faucet body is indented like said bushing and is formed in alignment of and adjacent with said inlet union.

3. A faucet as set forth in claim 1, wherein said cover is screwed into the faucet body and is knurled, and said rotatable portion of the cartridge comprises a control head coupled to the rotatable plate and an actuation shaft onto which is formed said shoulder resting against the cover.

4. A faucet as set forth in claim 1, wherein said cover is cap-shaped, said rotatable portion of the cartridge comprises a control head coupled with the rotatable plate and an actuation shaft traversing said cover, the surface of said control head opposite the rotatable plate forming the shoulder resting against the cover, said cartridge partly projects from the faucet body and is contained within said cap-shaped cover, and a control handle is coupled with said actuation shaft and surrounds said cap-shaped cover.

5. A faucet as set forth in claim 1, wherein said rotatable portion of the cartridge comprises a control head having a lateral tooth, and said cartridge envelope has a portion limited to a sector forming stops cooperable with said tooth in limiting the angle of rotation of the control head, and above said portion limited to a sector has at least one projection cooperable with said tooth in forming a bayonet joint between said envelope and said rotatable portion of the cartridge.

6. A faucet as set forth in claim 1, wherein said cartridge envelope has a peripherically elongated opening, and said rotatable portion of the cartridge has a radial screw whose external protruding portion engages said elongated opening of the envelope and cooperates therewith both in limiting the angle of rotation of said rotatable portion of the cartridge and in preventing axial extraction thereof from the cartridge envelope.

7. A faucet as set forth in claim 1, wherein said rotatable portion of the cartridge has a recess opening on one hand in register with the through aperture of the coupled rotatable plate and on the other hand on the side surface of said rotatable portion, and said envelope has a lateral delivery window cooperable with said recess of the rotatable portion of the cartridge in throttling the water flow in the intermediate control positions of the faucet.

8. A faucet as set forth in claim 7, wherein said rotatable portion of the cartridge has cuts or tapered grooves laterally departing from said recess at the opening thereof on the side surface of said rotatable portion.

9. A faucet as set forth in claim 7, wherein said rotatable portion of the cartridge has at least one projection engaging the rotatable plate, as well as protrusions at both sides of the opening of said recess in register with the through aperture of the rotatable plate, said protrusions partially penetrating within said through aperture of the rotatable plate.

10. A faucet as set forth in claim 1, wherein both said stationary and rotatable plates are identical with one another, and each of them has a single excentrical through aperture having substantially the form of a circular segment, and, on the face opposite the surface intended to slide against the other plate, has a recess extending perpendicularly to said through aperture.

* * * * *